(12) United States Patent
Liu et al.

(10) Patent No.: US 11,617,130 B2
(45) Date of Patent: Mar. 28, 2023

(54) CARRIER INFORMATION INDICATION METHOD AND APPARATUS, CELL SEARCH METHOD AND APPARATUS, AND BASE STATION

(71) Applicant: BEIJING XIAOMI MOBILE SOFTWARE CO., LTD., Beijing (CN)

(72) Inventors: Yang Liu, Beijing (CN); Qin Mu, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 87 days.

(21) Appl. No.: 17/274,951

(22) PCT Filed: Sep. 11, 2018

(86) PCT No.: PCT/CN2018/105049
§ 371 (c)(1),
(2) Date: Mar. 10, 2021

(87) PCT Pub. No.: WO2020/051770
PCT Pub. Date: Mar. 19, 2020

(65) Prior Publication Data
US 2022/0039000 A1    Feb. 3, 2022

(51) Int. Cl.
*H04W 4/70* (2018.01)
*H04W 48/16* (2009.01)
(Continued)

(52) U.S. Cl.
CPC .............. *H04W 48/16* (2013.01); *H04W 4/70* (2018.02); *H04W 48/20* (2013.01); *H04W 52/0219* (2013.01)

(58) Field of Classification Search
CPC ....... H04W 48/16; H04W 4/70; H04W 48/20; H04W 52/0219; H04W 48/12; Y02D 30/70
See application file for complete search history.

(56) References Cited

U.S. PATENT DOCUMENTS

| 9,031,019 B2 | 5/2015 | Kim |
| 9,603,166 B2 | 3/2017 | Kim |

(Continued)

FOREIGN PATENT DOCUMENTS

| CN | 103716122 A | 4/2014 |
| CN | 106792931 A | 5/2017 |

(Continued)

OTHER PUBLICATIONS

International Search Report dated Apr. 22, 2019 in PCT/CN2018/105049 (submitting English translation only), 2 pages.
(Continued)

*Primary Examiner* — Said M Elnoubi
(74) *Attorney, Agent, or Firm* — Oblon, McClelland, Maier & Neustadt, L.L.P.

(57) ABSTRACT

The present disclosure relates to a carrier information indication method and apparatus, a cell search method and apparatus, a base station, a user equipment and a computer-readable storage medium. The carrier information indication method includes setting independent machine-type communication (MTC) carrier information; and transmitting the independent MTC carrier information to a user equipment (UE). In the aspects of the disclosure, by means of setting independent MTC carrier information and transmitting the independent MTC carrier information to a UE, the UE does not need to search for an independent MTC carrier when searching for a cell, thereby saving on the electricity of the UE.

8 Claims, 5 Drawing Sheets

(51) Int. Cl.
  *H04W 48/20*   (2009.01)
  *H04W 52/02*   (2009.01)

(56) References Cited

U.S. PATENT DOCUMENTS

| | | | |
|---|---|---|---|
| 2010/0015973 A1* | 1/2010 | Islam | H04W 48/16 |
| | | | 455/434 |
| 2013/0077582 A1 | 3/2013 | Kim et al. | |
| 2015/0245378 A1 | 8/2015 | Kim et al. | |
| 2017/0196019 A1 | 7/2017 | Kim et al. | |
| 2018/0152269 A1 | 5/2018 | Xiong et al. | |

FOREIGN PATENT DOCUMENTS

| | | | | |
|---|---|---|---|---|
| CN | 107371202 A | * | 11/2017 | ........ H04W 36/0055 |
| CN | 107771409 A | * | 3/2018 | ............ H04L 5/001 |
| CN | 107771409 A | | 3/2018 | |

OTHER PUBLICATIONS

Written Opinion of the International Searching Authority dated Apr. 22, 2019 in PCT/CN2018/105049, (submitting English translation only), 4 pages.
Combined Chinese Office Action and Search Report dated Jul. 25, 2019 in Chinese Patent Application No. 201880001849.7 (with English translation of categories of cited documents), 8 pages.
Combined Chinese Office Action dated Mar. 2, 2020 in Chinese Patent Application No. 201880001849.7, 8 pages.
Combined Chinese Office Action dated Sep. 21, 2020 in Chinese Patent Application No. 201880001849.7, 8 pages.

\* cited by examiner

CARRIER INFORMATION INDICATION METHOD AND APPARATUS, CELL SEARCH METHOD AND APPARATUS, AND BASE STATION

CROSS-REFERENCE TO RELATED APPLICATIONS

This application is a U.S. National Stage application of PCT International Application No. PCT/CN2018/105049 filed on Sep. 11, 2018, the entire contents of which are incorporated herein by reference.

TECHNICAL FIELD

The present disclosure relates to the field of communication technology, and more particularly to a method and device for indicating carrier information, a method and device for cell search, a base station, user equipment, and a computer-readable storage medium

BACKGROUND

Machine Type Communication (MTC) refers to communication between machines without human intervention, which is widely applied to many fields such as smart cities, smart agriculture and smart transportation. A basic MTC communication framework is formed in a Long Term Evolution (LTE) system, which supports features such as low complexity or low cost, coverage enhancement, power savings.

Conventional MTC is deployed on the frequency spectrum of the LTE, and shares frequency resources and partial channels with the conventional LTE user. Specifically, the conventional MTC and the LTE user share a Primary Synchronization Signal (PSS), a Secondary Synchronization Signal (SSS), and a Physical Broadcast Channel (PBCH).

In a conventional LTE Frequency Division Duplex (FDD) system, the SSS and the PSS are transmitted in the same slot of the same sub-frame, but the SSS occupies the penultimate symbol, which is one symbol ahead of the PSS. For MTC, the conventional PSS or the SSS are completely multiplexed.

For MTC, in addition to transmitting the original PBCH, the system also needs to perform repeat transmission of a corresponding PBCH. In addition to transmitting the PBCH in the first four OFDM symbols of the second slot of the sub-frame 0, the system also performs repeat transmission of the PBCH on the remaining physical resources of the sub-frame 9 and the sub-frame 0. For a conventional LTE User Equipment (UE), only the first four OFDM symbols of the second slot of the sub-frame 0 are combined in 40 ms to demodulate PBCH information. For an MTC user, all resources of the sub-frame 0 and the sub-frame 9 are combined to demodulate the PBCH information.

When the UE wants to access a cell, the UE first receives a PSS or an SSS to perform downlink synchronization. After the downlink synchronization is completed, the UE receives and demodulates a PBCH. Upon successful reception of the PBCH, the UE receives subsequent System Information Block (SIB) information and reads related parameters for subsequent random access.

Since the MTC cannot be deployed standalone of the LTE system at present, the deployment mode lacks flexibility, especially with the introduction of the 5G New Radio, the LTE system gradually quits, which inevitably brings limitations to the deployment of the MTC. In some cases, for example, in an idle-state scenario, the UE searches for carriers or frequency points of the MTC during non-initial access, and then can know these frequency bands cannot be accessed, thereby wasting electrical energy of the UE.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide a method for indicating carrier information, applied to a base station. The method includes setting standalone Machine Type Communication (MTC) carrier information; and transmitting the standalone MTC carrier information to a User Equipment (UE).

According to an aspect, when transmitting the standalone MTC carrier information to the UE, the method further includes carrying the standalone MTC carrier information in newly-added system information or a newly-added information element in original system information, and transmitting the system information carrying the standalone MTC carrier information to the UE.

According to another aspect, when setting the standalone MTC carrier information, the method further includes separately setting a cell operation carrier of MTC and a cell operation carrier of Long Term Evolution (LTE), wherein transmitting the standalone MTC carrier information to the UE includes: transmitting to the UE, through high-layer signaling, the cell operation carrier of the MTC and the cell operation carrier of the LTE that are set separately; or adding the cell operation carrier of the MTC into a cell forbidden access list, and transmitting the cell forbidden access list to the UE; or adding the cell operation carrier of the LTE into a cell selection or reselection frequency point list, and transmitting the cell selection or reselection frequency point list to the UE.

Aspects of the disclosure also provide a method for cell search, applied to Long Term Evolution (LTE) User Equipment (UE). The method includes receiving standalone Machine Type Communication (MTC) carrier information transmitted by a base station; and performing cell search on a carrier other than an MTC carrier indicated by the standalone MTC carrier information.

According to an aspect, when receiving the standalone MTC carrier information transmitted by the base station, the method further includes receiving newly-added system information or original system information transmitted by the base station; and parsing the system information to obtain the standalone MTC carrier information.

According to another aspect, when receiving the standalone MTC carrier information transmitted by the base station, the method further includes receiving higher-layer signaling transmitted by the base station; and parsing the higher-layer signaling to obtain a cell operation carrier of MTC and a cell operation carrier of LTE that are set separately.

According to yet another aspect, when performing the cell search on the carrier other than the MTC carrier indicated by the standalone MTC carrier information, the method further includes adding the cell operation carrier of the LTE into a cell selection or reselection frequency point list; and performing cell search on the operation carrier comprised in the cell selection or reselection frequency point list.

According to yet another aspect, when performing the cell search on the carrier other than the MTC carrier indicated by the standalone MTC carrier information, the method further includes adding the cell operation carrier of the MTC into a cell forbidden access list; and performing cell search on a carrier other than the operation carrier comprised in the cell forbidden access list.

According to another aspect, the method further includes receiving a cell forbidden access list transmitted by the base station, and wherein performing the cell search on the carrier other than the MTC carrier indicated by the standalone MTC carrier information includes performing cell search on a carrier other than an operation carrier comprised in the cell forbidden access list.

According to yet another aspect, the method further includes receiving a cell selection or reselection frequency point list transmitted by the base station, and wherein performing the cell search on the carrier other than the MTC carrier indicated by the standalone MTC carrier information includes performing cell search on an operation carrier comprised in the cell selection or reselection frequency point list.

Aspects of the disclosure also provide a base station that is configured to execute the method for indicating carrier information described above.

Aspects of the disclosure further provide a User Equipment (UE). The UE includes a processor; and a memory for storing instructions executable by the processor. The processor is configured to execute the instructions to: receive standalone Machine Type Communication (MTC) carrier information transmitted by a base station; and perform cell search on a carrier other than an MTC carrier indicated by the standalone MTC carrier information.

It is to be understood that the foregoing general description and the following detailed description are only illustrative and explanatory and are not intended to limit the present disclosure.

BRIEF DESCRIPTION OF THE DRAWINGS

The accompanying drawings, which are incorporated in and constitute a part of this specification, illustrate aspects consistent with the present disclosure and, together with the description, serve to explain the principles of the present disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of illustrative aspects do not represent all implementations consistent with the disclosure. Instead, they are merely examples of apparatuses and methods consistent with aspects related to the disclosure as recited in the appended claims.

Figure 1:
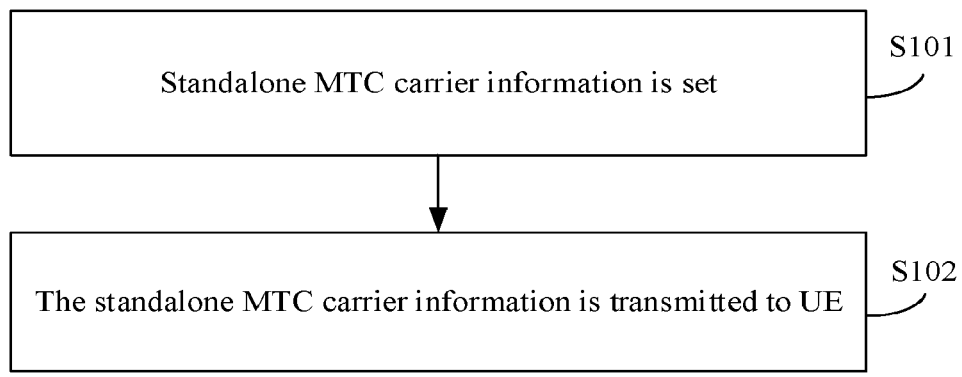
FIG. 1 is a flowchart of a method for indicating carrier information according to an exemplary aspect of the present disclosure.

FIG. 1 is a flowchart of a method for indicating carrier information according to an exemplary aspect of the present disclosure. The exemplary aspect is described from a base station side. As shown in FIG. 1, the method for indicating carrier information includes operations S101 and S102.

In S101, standalone MTC carrier information is set.

The standalone MTC carrier information refers to carrier information used for standalone MTC networking.

In S102, the standalone MTC carrier information is transmitted to the UE.

For UEs of different versions, the standalone MTC carrier information may be transmitted to the UE in different manners.

In a manner 11), for a LTE UE in the new version (R16), the standalone MTC carrier information may be carried in newly-added system information or newly-added Information Element (IE) in original system information, and the system information carrying the standalone MTC carrier information is transmitted to the UE.

The newly-added system information refers to system information dedicated to define cell reselection, for example, system information 4. The name of the newly-added IE may be used to indicate the standalone MTC carrier information.

In a manner 12), for a LTE UE in the old version, the base station may set a cell operation carrier of the MTC and a cell operation carrier of the LTE separately, and transmit and the cell operation carrier of the MTC and the cell operation carrier of the LTE which are set separately to the UE through higher-layer signaling.

The higher-layer signaling may include Radio Resource Control (RRC) signaling.

It should be noted that since the new version of the protocol indicates the purpose of the newly-added IE, the new version of the LTE UE can use the newly-added IE. The old version of the protocol does not indicate the purpose of the newly-added IE, and the newly-added IE cannot be used by the LTE UE in the old version. Therefore, different processing manners can be used for different versions.

In an aspect, the base station may add the cell operation carrier of the MTC into a cell forbidden access list and transmit the cell forbidden access list to the UE. The base station may also add a cell operation carrier of the LTE into a cell selection or reselection frequency point list and transmit the cell selection or reselection frequency point list to the UE.

In the above aspect, standalone MTC carrier information is set and transmitted to the UE, so that the UE does not search for a carrier of the standalone MTC when searching for a cell, thereby saving electrical energy of the UE.

Figure 2:
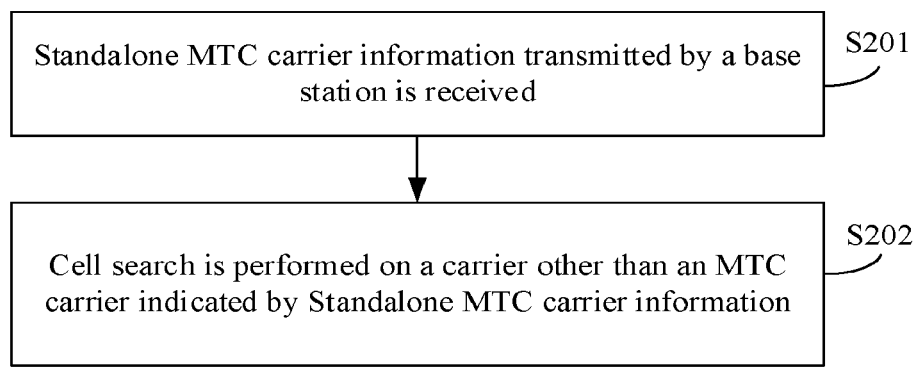
FIG. 2 is a flowchart of a method for cell search according to an exemplary aspect of the present disclosure.

FIG. 2 is a flowchart of a method for cell search according to an exemplary aspect of the present disclosure. The exemplary aspect is described from a LTE UE side. As shown in FIG. 2, the method includes operations S201 and S202.

In S201, standalone MTC carrier information transmitted by a base station is received.

For UEs of different versions, the standalone MTC carrier information transmitted by the base station may be received in different manners.

In a manner 21), newly-added system information or original system information transmitted by the base station is received, and the system information is parsed to obtain the standalone MTC carrier information.

The UE may receive the system information transmitted by the base station, and obtain version information of the UE based on version information carried by an IE in the system information.

In a manner 22), higher-layer signaling transmitted by the base station is received, and the higher-layer signaling is parsed to obtain a cell operation carrier of the MTC and a cell operation carrier of the LTE which are set separately.

The higher-layer signaling may include Radio Resource Control (RRC) signaling.

In S202, cell search is performed on a carrier other than a MTC carrier indicated by the standalone MTC carrier information.

In this aspect, in a case that the standalone MTC carrier information obtained by parsing includes the cell operation carrier of the MTC and the cell operation carrier of the LTE, the cell operation carrier of the LTE may be added into a cell selection or reselection frequency point list, and cell search may be performed on an operation carrier included in the cell selection or reselection frequency point list. The cell operation carrier of the MTC may be added into a cell forbidden access list, and cell search may be performed on a carrier other than an operation carrier included in the cell forbidden access list. In this way, the UE does not search for a carrier of a standalone MTC cell, thereby saving electrical energy.

The cell selection or reselection frequency point list refers to a set of frequency points based on which a cell is selected or reselected, and the cell forbidden access list refers to a set of frequency points which is not relied upon when a cell is selected.

In addition, in an aspect, the UE may also receive the cell forbidden access list transmitted by the base station, and perform cell search on a carrier other than the operation carrier contained in the cell forbidden access list. In an aspect, the UE may also receive a cell selection or reselection frequency point list transmitted by the base station, and perform cell search on the operation carrier included in the cell selection or reselection frequency point list.

In the above aspect, standalone MTC carrier information transmitted by the base station is received, and cell search is performed on a carrier other than the MTC carrier indicated by the standalone MTC carrier information, thereby avoiding searching for a carrier of a standalone MTC cell, and saving electrical energy.

Figure 3:
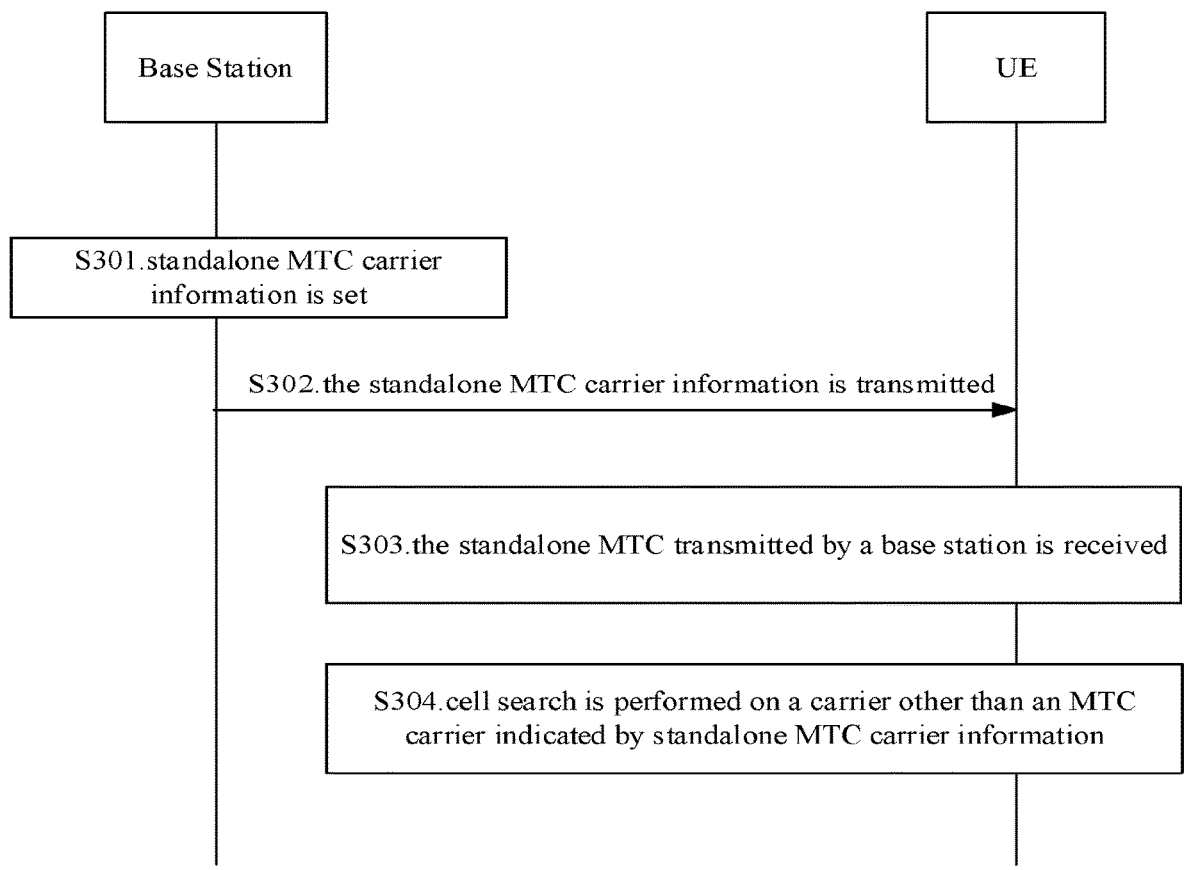
FIG. 3 is a signaling flowchart of a method for cell search according to an exemplary aspect of the present disclosure.

FIG. 3 is a signaling flowchart of a method for cell search according to an exemplary aspect of the present disclosure. The exemplary aspect is described from the perspective of interaction between a LTE UE and a base station. As shown in FIG. 3, the method includes operations S301 to S304.

In S301, the base station sets standalone MTC carrier information.

In S302, the base station transmits the standalone MTC carrier information to the LTE UE.

In S303, the LTE UE receives the standalone MTC carrier information transmitted by the base station.

In S304, the LTE UE performs cell search on a carrier other than an MTC carrier indicated by the standalone MTC carrier information.

In the above aspect, with the interaction between the base station and the LTE UE, the UE can be avoid from searching for a carrier of a standalone MTC cell, thereby saving electrical energy.

Figure 4:
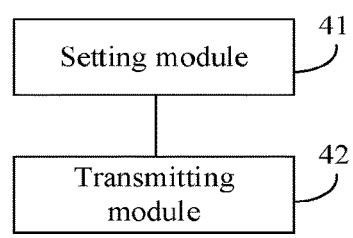
FIG. 4 is a block diagram of a device for indicating carrier information according to an exemplary aspect.

FIG. 4 is a block diagram of a device for indicating carrier information according to an exemplary aspect. The device may be provided in a base station. As shown in FIG. 4, the device includes a setting module 41 and a transmitting module 42.

The setting module 41 is configured to set standalone machine Type communication (MTC) carrier information.

The standalone MTC carrier information refers to carrier information used for standalone MTC networking.

The transmitting module 42 is configured to transmit the standalone MTC carrier information set by the setting module 41 to User Equipment (UE).

For UEs of different versions, the standalone MTC carrier information may be transmitted to the UE in different manners.

In a manner 11), for a LTE UE in the new version (R16), the standalone MTC carrier information may be carried in newly-added system information or newly-added Information Element (IE) in original system information, and the system information carrying the standalone MTC carrier information is transmitted to the UE.

In a manner 12), for a LTE UE in the old version, the base station may set a cell operation carrier of the MTC and a cell operation carrier of the LTE separately, and transmit the cell operation carrier of the MTC and the cell operation carrier of the LTE which are set separately to the UE through higher-layer signaling.

The higher-layer signaling may include Radio Resource Control (RRC) signaling.

In an aspect, the base station may add the cell operation carrier of the MTC into a cell forbidden access list, and transmit the cell forbidden access list to the UE. The base station may also add a cell operation carrier of the LTE into a cell selection or reselection frequency point list, and transmit the cell selection or reselection frequency point list to the UE.

In the above aspect, standalone MTC carrier information is set and transmitted to the UE, so that the UE does not search for a carrier of the standalone MTC when searching for a cell, thereby saving electrical energy of the UE.

Figure 5:
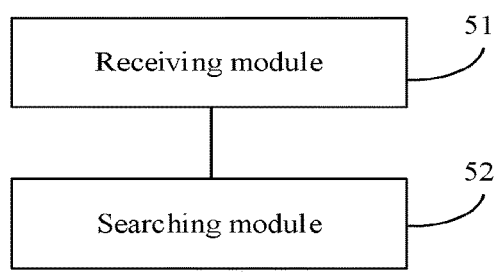
FIG. 5 is a block diagram of a device for cell search according to an exemplary aspect.

FIG. 5 is a block diagram of a device for cell search according to an exemplary aspect. The device may be provided in an LTE UE. As shown in FIG. 5, the device includes a receiving module 51 and a searching module 52.

The receiving module 51 is configured to receive standalone Machine Type Communication (MTC) carrier information transmitted by a base station.

The searching module 52 is configured to perform cell search on a carrier other than an MTC carrier indicated by the standalone MTC carrier information received by the receiving module 51.

In an aspect, the receiving module 51 may be further configured to receive a cell forbidden access list transmitted by the base station. The searching module 52 may be configured to perform cell search on a carrier other than an operation carrier included in the cell forbidden access list.

In an aspect, the receiving module 51 may be further configured to receive a cell selection or reselection frequency point list transmitted by the base station. The searching module 52 may be configured to perform cell search on an operation carrier included in the cell selection or reselection frequency point list. In the above aspect, the standalone MTC carrier information transmitted by the base station is received, and cell search is performed on a carrier other than the MTC carrier indicated by the standalone MTC carrier information, thereby avoiding searching for a carrier of a standalone MTC cell, and saving electrical energy.

Figure 6:
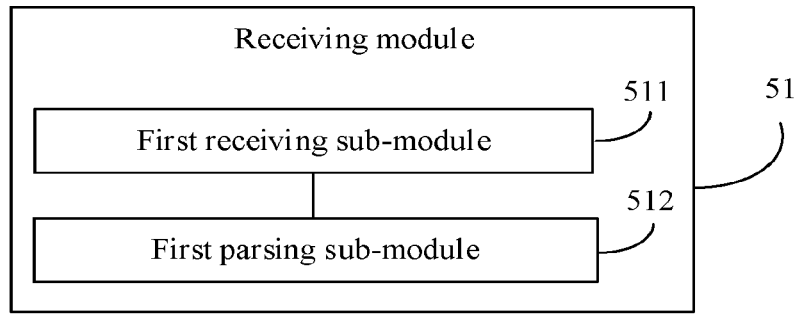
FIG. 6 is a block diagram of another device for cell search according to an exemplary aspect.

FIG. 6 is a block diagram of another device for cell search according to an exemplary aspect. As shown in FIG. 6, based on the aspect shown in FIG. 5, a receiving module 51 may include a first receiving sub-module 511 and a first parsing sub-module 512.

The first receiving sub-module 511 is configured to receive newly-added system information or original system information transmitted by a base station.

The UE may receive the system information transmitted by the base station, and obtain version information of the UE based on version information carried by an IE in the system information.

The first parsing sub-module 512 is configured to parse the system information received by the first receiving sub-module 511 to obtain the standalone MTC carrier information.

The higher-layer signaling may include Radio Resource Control (RRC) signaling.

In the above aspect, the newly-added system information or the original system information transmitted by the base station is received, and the system information is parsed to obtain the standalone MTC carrier information. Therefore, the implementation is simple.

Figure 7:
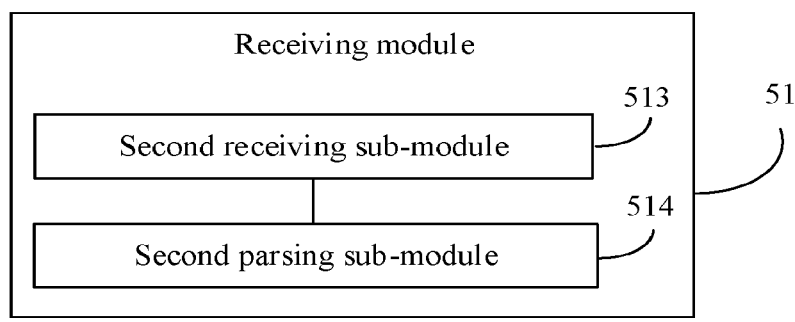
FIG. 7 is a block diagram of another device for cell search according to an exemplary aspect.

FIG. 7 is a block diagram of another device for cell search according to an exemplary aspect. As shown in FIG. 7, based on the aspect shown in FIG. 5, a receiving module 51 may include a second receiving sub-module 513 and a second parsing sub-module 514.

The second receiving sub-module 513 is configured to receive higher-layer signaling transmitted by a base station.

The second parsing sub-module 514 is configured to parse the higher-layer signaling received by the second receiving sub-module 513 to obtain a cell operation carrier of MTC and a cell operation carrier of LTE which are set separately.

In the above aspect, the higher-layer signaling transmitted by the base station is received and parsed to obtain the cell operation carrier of the MTC and the cell operation carrier of the LTE which are set separately. Therefore, the implementation is simple.

Figure 8:
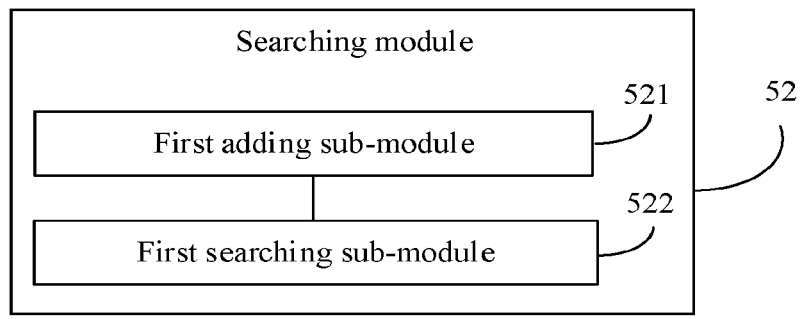
FIG. 8 is a block diagram of another device for cell search according to an exemplary aspect.

FIG. 8 is a block diagram of another device for cell search according to an exemplary aspect. As shown in FIG. 8, based on the aspect shown in FIG. 7 described above, the searching module 52 may include a first adding sub-module 521 and a first searching sub-module 522.

The first adding sub-module 521 is configured to add a cell operation carrier of LTE into a cell selection or reselection frequency point list.

The first searching sub-module 522 is configured to perform cell search on an operation carrier included in the cell selection or reselection frequency point list obtained after the cell operation carrier of the LTE is added by the first adding sub-module 521.

In the aspect, in a case that the standalone MTC carrier information obtained by parsing includes the cell operation carrier of the MTC and the cell operation carrier of the LTE, the cell operation carrier of the LTE may be added into the cell selection or reselection frequency point list, and cell search may be performed on an operation carrier included in the cell selection or reselection frequency point list.

In the above aspect, the cell operation carrier of the LTE is added into the cell selection or reselection frequency point list, and cell search is performed on the operation carrier included in the cell selection or reselection frequency point list, thereby avoiding searching for a carrier of a standalone MTC cell, and saving electrical energy.

Figure 9:
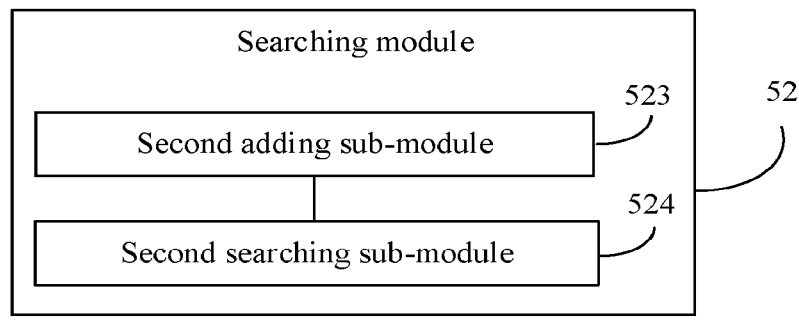
FIG. 9 is a block diagram of another device for cell search according to an exemplary aspect.

FIG. 9 is a block diagram of another device for cell search according to an exemplary aspect. As shown in FIG. 9, based on the aspect shown in FIG. 7 described above, the searching module 52 may include a second adding sub-module 523 and a second searching sub-module 524.

The second adding sub-module 523 is configured to add a cell operation carrier of MTC into a cell forbidden access list.

The second searching sub-module 524 is configured to perform cell search on a carrier other than an operation carrier included in the cell forbidden access list obtained after the cell operation carrier of the MTC is added by the second adding sub-module 523.

In this aspect, in a case that the standalone MTC carrier information obtained by parsing includes the cell operation carrier of the MTC and the cell operation carrier of the LTE, the cell operation carrier of the MTC may be added into the cell forbidden access list, and cell search may be performed on a carrier other than an operation carrier included in the cell forbidden access list. In this way, the UE is avoided from searching for a carrier of a standalone MTC, thereby saving electrical energy.

In the above aspect, the cell operation carrier of the MTC is added into the cell forbidden access list, and cell search is performed on a carrier other than the operation carrier included in the cell forbidden access list, thereby avoiding searching for a carrier of a standalone MTC, and saving electrical energy.

Figure 10:
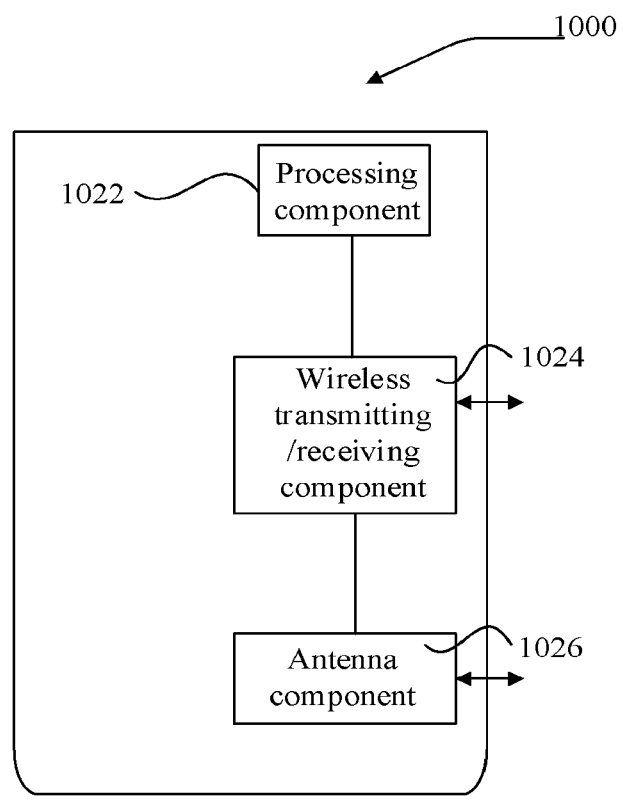
FIG. 10 is a block diagram of a device for indicating carrier information according to an exemplary aspect.

FIG. 10 is a block diagram of another device for indicating carrier information according to an exemplary aspect. The device 1000 may be provided as a base station. Referring to FIG. 10, the device 1000 includes a processing component 1022, a wireless transmitting/receiving component 1024, an antenna component 1026, and a signal processing portion specific to the wireless interface. The processing component 1022 may further include one or more processors, One of the processors in the processing component 1022 may be configured to set standalone Machine Type Communication (MTC) carrier information, and transmit the standalone MTC carrier information to User Equipment (UE).

In an exemplary aspect, a non-transitory computer-readable storage medium including instructions is further provided. The above instructions may be executed by the processing component 1022 of the device 1000 to perform the method for indicating carrier information described above. The non-transitory computer-readable storage medium may be, for example, a ROM, a Random Access Memory (RAM), a CD-ROM, a magnetic tape, a floppy disk, an optical data storage device.

Figure 11:
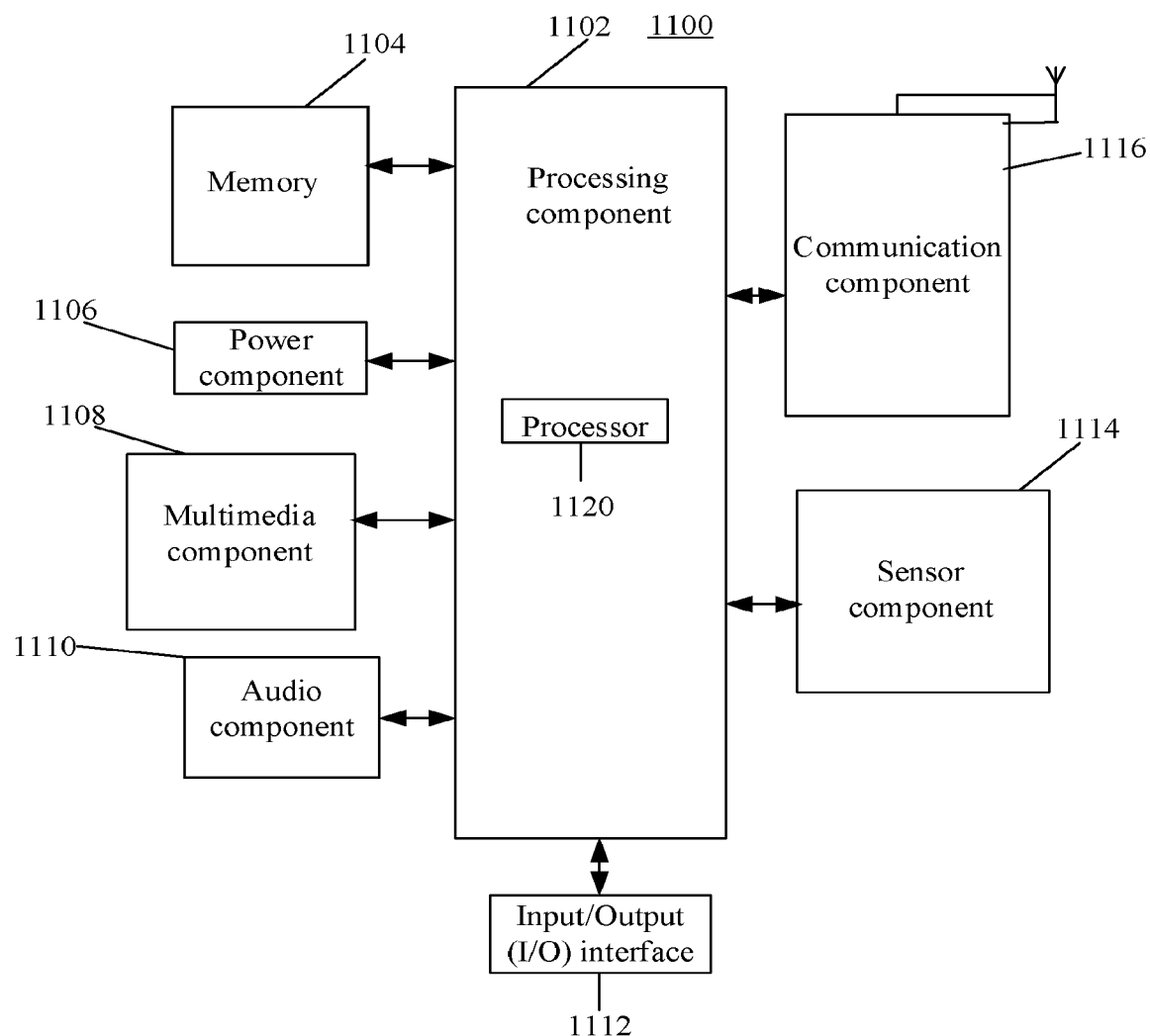
FIG. 11 is a block diagram of a device for cell search according to an exemplary aspect.

FIG. 11 is a block diagram of a device for indicating carrier information according to an exemplary aspect. For example, the device 1100 may be a mobile phone, a computer, a digital broadcasting terminal, messaging equipment, a game console, tablet equipment, medical equipment, fitness equipment, and a personal digital assistant.

Referring to FIG. 11, the device 1100 may include one or more components: a processing component 1102, a memory 1104, a power component 1106, a multimedia component 1108, an audio component 1110, an input/output (I/O) interface 1112, a sensor component 1114, and a communication component 1116.

The processing component 1102 generally controls overall operation of the device 1100, such as operations related to displaying, telephone calls, data communications, camera operations, and recording operations. The processing component 1102 may include one or more processors 1120 which execute instructions, to implement all or a portion of the steps of the method described above. In addition, the processing component 1102 may include one or more modules to facilitate interaction between the processing component 1102 and other components. For example, the processing component 1102 may include a multimedia module to facilitate interaction between the multimedia component 1108 and the processing component 1102.

One of the processors 1120 in the processing component 1102 may be configured to receive standalone Machine Type Communication (MTC) carrier information transmitted by a base station, and perform cell search on a carrier other than an MTC carrier indicated by the standalone MTC carrier information.

The memory 1104 is configured to store various types of data to support operation at the device 1100. Examples of such data include instructions for any application program or method operating on the device 1100, contact data, phone book data, messages, pictures, videos, etc. The memory 1104 may be implemented by any type of volatile or non-volatile storage devices or a combination thereof, such as a Static Random Access Memory (SRAM), an Electrically Erasable Programmable Read-Only Memory (EEPROM), an Electrically Programming Read-Only Memory (EPROM), a Programmable Read-Only Memory (PROM), a Read-Only Memory (ROM), a magnetic memory, a flash memory, a magnetic disk or an optical disk.

The power component 1106 provides power for various components of the device 1100. The power component 1106 may include a power management system, one or more power supplies, and other components associated with generating, managing, and distributing power for device 1100.

The multimedia component 1108 includes a screen providing an output interface between the device 1100 and a user. In some aspects, the screen may include a Liquid Crystal Display (LCD) and a Touch Panel (TP). If the screen includes the TP, the screen may be implemented as a touch screen to receive an input signal from the user. The TP includes one or more touch sensors to sense touch, swipe, and gestures on the TP. The touch sensors may not only sense a boundary of a touch or swipe action, but also detect a time of duration and a pressure associated with the touch or swipe action. In some aspects, the multimedia component 1108 includes a front camera and/or a rear camera. The front camera and/or the rear camera may receive external multimedia data when the device 1100 is in an operation mode, such as a photographing mode or a video mode. Each front camera and each rear camera may be fixed optical lens systems or may have focal lengths and optical zoom capabilities.

The audio component 1110 is configured to output and/or input audio signals. For example, the audio component 1110 includes a microphone (MIC), and the microphone is configured to receive an external audio signal when the device 1100 is in an operation mode, such as a calling mode, a recording mode, and a voice identification mode. The received audio signals may be further stored in the memory 1104 or transmitted via the communication component 1116. In some aspects, the audio component 1110 may further include a speaker to output audio signals.

The I/O interface 1112 provides an interface between the processing component 1102 and peripheral interface modules, which may be keyboards, click wheels, buttons, etc. These buttons may include, but be not limited to, a home button, a volume button, a start button, and a lock button.

The sensor component 1114 includes one or more sensors configured to provide various aspects of state assessment for the device 1100. For example, the sensor component 1114 may detect an on/off status of the device 1100, and relative positioning of components. For example, the component is a display and a keypad of the device 1100. The sensor component 1114 may also detect a change in position of the device 1100 or a component of the device 1100, presence or absence of user contact with the device 1100, an orientation or an acceleration/deceleration of the device 1100, and a change in temperature of the device 1100. The sensor component 1114 may include a proximity sensor configured to detect the presence of nearby objects without any physical contact. The sensor component 1114 may also include light sensors, such as CMOS or CCD image sensors, for imaging applications. In some aspects, the sensor component 1114 may also include an acceleration sensor, a gyroscope sensor, a magnetic sensor, a pressure sensor, or a temperature sensor.

The communication component 1116 is configured to facilitate wired or wireless communications between the device 1100 and another device. The device 1100 may access a wireless network based on a communication standard, such as a WiFi, a 2G or a 3G, or a combination thereof. In an exemplary aspect, the communication component 1116 receives a broadcast signal or broadcasts related information from an external broadcast management system via a broadcast channel. In one exemplary aspect, the communication component 1116 further includes a Near Field Communication (NFC) module to promote short-range communications. For example, the NFC module may be implemented based on a Radio Frequency Identification (RFID) technology, an Infrared Data Association (IrDA) technology, an Ultra-Wide Band (UWB) technology, a Bluetooth (BT) technology and other technologies.

In the exemplary aspect, the device 1100 may be implemented by one or more Application-Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors, or other electronic components to implement the above method.

In the exemplary aspect, a non-transitory computer-readable storage medium including an instruction, such as a memory 1104 including an instruction, is further provided. The instruction may be executed by a processor 1120 of the device 1100 to implement the foregoing method. For example, the non-transitory computer-readable storage medium may be a Read Only Memory (ROM), a Random Access Memory (RAM), a CD-ROM, a magnetic tape, a floppy disc, an optical data storage device, and the like.

Since the device aspect substantially corresponds to the method aspect, the reference can be made to the partial description of the method aspect for the relevant parts. The device aspects described above are merely illustrative, and the elements illustrated as separate components may or may not be physically separate, and the components shown as the elements may or may not be physical elements, that is, the components may be disposed at the same location, or may be distributed on multiple network elements. A part or all of the modules may be selected to achieve the objectives of the aspects according to actual demands. Those of ordinary skill in the art will understand and implement without inventive effort.

It is to be noted that relational terms such as "first", "second" and the like in the present disclosure are used only to distinguish one entity or operation from another entity or operation and not to require or imply existence of any such practical relationship or sequence between these entities or operations. Terms "include" and "including" or any other variation thereof is intended to cover nonexclusive inclusions, so that a process, method, object or device including a series of elements not only includes those elements, but also includes other elements that are not clearly listed, or further includes elements intrinsic to the process, the method, the object or the device. Under the condition of no more limitations, an element defined by statement "including a/an . . . " does not exclude existence of another element that is the same in a process, method, object or device including the element.

It is noted that the various modules, sub-modules, units, and components in the present disclosure can be implemented using any suitable technology. For example, a module may be implemented using circuitry, such as an integrated circuit (IC). As another example, a module may be implemented as a processor or a processing circuit executing software instructions.

Other aspects of the present disclosure will be apparent to those skilled in the art from consideration of the specification and practice of the present disclosure. The present disclosure is intended to cover any variations, uses, or adaptations of the present disclosure conforming to the general principles thereof and including common knowledge and customary practice in the technical filed which is not disclosed in the present disclosure. The specification and aspects are exemplary, and a true scope and spirit of the present disclosure are indicated by the following claims.

It will be appreciated that the present disclosure is not limited to the exact construction that has been described above and illustrated in the accompanying drawings, and that various modifications and changes may be made without departing from the scope of the present disclosure. It is intended that the scope of the present disclosure is only limited by the appended claims.

The invention claimed is:

1. A method for indicating carrier information, applied to a base station, the method comprising:
setting standalone Machine Type Communication (MTC) carrier information; and
transmitting the standalone MTC carrier information to a User Equipment (UE),
wherein the setting the standalone MTC comprises:
for a UE in new version, carrying the standalone MTC carrier information in system information; and
for a UE in old version, separately setting a cell operation carrier of MTC and a cell operation carrier of Long Term Evolution (LTE),
wherein the transmitting the standalone MTC carrier information to the UE comprises:
for the UE in new version, transmitting the system information carrying the standalone MTC carrier information to the UE; and
for the UE in old version, transmitting to the UE, through high-layer signaling, the cell operation carrier of the MTC and the cell operation carrier of the LTE that are set separately; or for the UE in old version, adding the cell operation carrier of the MTC into a cell forbidden access list, and transmitting the cell forbidden access list to the UE; or for the UE in old version, adding the cell operation carrier of the LTE into a cell selection or reselection frequency point list, and transmitting the cell selection or reselection frequency point list to the UE.

2. A base station, configured to execute the method for indicating carrier information of claim 1.

3. A method for cell search, applied to Long Term Evolution (LIE) User Equipment (UE), the method comprising:
receiving standalone Machine Type Communication (MTC) carrier information transmitted by a base station; and
performing cell search on a carrier other than an MTC carrier indicated by the standalone MTC carrier information,
wherein the receiving the standalone MTC carrier information transmitted by the base station comprises:
for a UE in new version, receiving system information carrying the standalone MTC carrier information transmitted by the base station, and parsing the system information to obtain the standalone MTC carrier information;
for a UE in old version, receiving higher-layer signaling transmitted by the base station; and parsing the higher-layer signaling to obtain a cell operation carrier of MTC and a cell operation carrier of LTE that are set separately,
the method further comprising:
for the UE in old version, receiving a cell forbidden access list transmitted by the base station, and wherein the performing the cell search on the carrier other than the MTC carrier indicated by the standalone MTC carrier information comprises: for the UE in old version, performing cell search on a carrier other than an operation carrier comprised in the cell forbidden access list; or
for the UE in old version, receiving a cell selection or reselection frequency point list transmitted by the base station, and wherein the performing the cell search on the carrier other than the MTC carrier indicated by the standalone MTC carrier information comprises: for the UE in old version, performing cell search on an operation carrier comprised in the cell selection or reselection frequency point list.

4. The method of claim 3, wherein performing the cell search on the carrier other than the MTC carrier indicated by the standalone MTC carrier information comprises:
adding the cell operation carrier of the LTE into the cell selection or reselection frequency point list; and
performing cell search on the operation carrier comprised in the cell selection or reselection frequency point list.

5. The method of claim 3, wherein performing the cell search on the carrier other than the MTC carrier indicated by the standalone MTC carrier information comprises:
   adding the cell operation carrier of the MTC into the cell forbidden access list; and
   performing cell search on a carrier other than the operation carrier comprised in the cell forbidden access list.

6. A User Equipment (UE), comprising:
   processor; and
   a memory for storing instructions executable by the processor,
   wherein the processor is configured to execute the instructions to:
      receive standalone Machine Type Communication (MTC) carrier information transmitted by a base station; and
      perform cell search on a carrier other than an MTC carrier indicated by the standalone MTC carrier information,
   wherein the processor is further configured to execute the instructions to:
      for a UE in new version, receive system information carrying the standalone MTC carrier information transmitted by the base station; and parse the system information to obtain the standalone MTC carrier information; and
      for a UE in old version, receive higher-layer signaling transmitted by the base station; and parse the higher-layer signaling to obtain a cell operation carrier of MTC and a cell operation carrier of LTE that are set separately,
   wherein the processor is further configured to execute the instructions to:
      for the UE in old version, receive a cell forbidden access list transmitted by the base station, and perform cell search on a carrier other than an operation carrier comprised in the cell forbidden access list; or
      for the UE in old version, receive a cell selection or reselection frequency point list transmitted by the base station, perform cell search on an operation carrier comprised in the cell selection or reselection frequency point list.

7. The UE of claim 6, wherein the processor is further configured to execute the instructions to:
   add the cell operation carrier of the LTE into the cell selection or reselection frequency point list; and
   perform cell search on the operation carrier comprised in the cell selection or reselection frequency point list obtained after the cell operation carrier of the LTE is added.

8. The UE of claim 6, wherein the processor is further configured to execute the instructions to:
   add the cell operation carrier of the MTC into the cell forbidden access list; and
   perform cell search on a carrier other than the operation carrier comprised in the cell forbidden access list obtained after the cell operation carrier of the MTC is added.

* * * * *